United States Patent
Lee et al.

(10) Patent No.: US 6,212,027 B1
(45) Date of Patent: Apr. 3, 2001

(54) STABLE UNLATCH CONTROL OF HARD DISK DRIVE

(75) Inventors: Jung-Ho Lee, Ahnyang; Gwan-Il Kim, Seongnam, both of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/012,488

(22) Filed: Jan. 23, 1998

(30) Foreign Application Priority Data

Jan. 28, 1997 (KR) .................................................. 97/2354

(51) Int. Cl.$^7$ ................................................. G11B 15/473
(52) U.S. Cl. ............................................................. 360/78.14
(58) Field of Search .................................. 360/75, 78.06, 360/78.14

(56) References Cited

U.S. PATENT DOCUMENTS

| | | | |
|---|---|---|---|
| 4,480,217 | * 10/1984 | Robbins et al. | 318/618 |
| 4,755,892 | * 7/1988 | Carteau et al. | 360/75 |
| 4,864,437 | * 9/1989 | Couse et al. | 360/75 |
| 5,235,476 | 8/1993 | Mikada et al. | 360/73.08 |
| 5,291,110 | 3/1994 | Andrews, Jr. et al. | 318/560 |
| 5,305,160 | 4/1994 | Funches et al. | 360/78.07 |
| 5,305,161 | 4/1994 | Giovanetti et al. | 360/78.06 |
| 5,315,455 | 5/1994 | Ito | 360/75 |
| 5,341,259 | 8/1994 | Amirkiaki et al. | 360/105 |
| 5,383,068 | 1/1995 | Shimizu et al. | 360/78.06 |
| 5,384,675 | 1/1995 | Crawforth et al. | 360/75 |
| 5,392,174 | 2/1995 | Suzuki | 360/78.06 |
| 5,465,034 | 11/1995 | Andrews, Jr. et al. | 318/560 |
| 5,485,323 | 1/1996 | Anderson et al. | 360/78.08 |
| 5,521,891 | 5/1996 | Nakane | 369/44.28 |
| 5,566,148 | * 10/1996 | Takahara et al. | 369/32 |
| 5,568,333 | 10/1996 | Bang | 360/105 |
| 5,600,219 | 2/1997 | Gomez | 318/456 |
| 5,675,558 | 10/1997 | Katoh | 369/32 |
| 5,754,357 | * 5/1998 | Anderson et al. | 360/75 |

FOREIGN PATENT DOCUMENTS

4400247 A1   1/1994 (DE) .
4-301278  * 10/1992 (JP) .

* cited by examiner

*Primary Examiner*—William Klimowicz
(74) *Attorney, Agent, or Firm*—Robert E. Bushnell, Esq.

(57) ABSTRACT

An unlatch control technique for enabling a hard disk drive to perform well a following sequence with a stable speed of a head being maintained after a head is unlatched by adjusting an unlatching deceleration current includes the steps of: detecting servo information written in a sector on a predetermined track of a disk when controlling the unlatching operation of the head; calculating the speed of the head which is unlatched by using the servo information; and adjusting the unlatching current depending on the head speed. Since the unlatching current can be adjusted through the feedback process of the head speed in the control of the unlatching operation, a more stable unlatching operation is accomplished.

38 Claims, 8 Drawing Sheets

STABLE UNLATCH CONTROL OF HARD DISK DRIVE

CLAIM OF PRIORITY

This application makes reference to, incorporates the same herein, and claims all benefits accruing under 35 U.S.C. §119 from an application for STABLE UNLATCH CONTROL OF HARD DISK DRIVE earlier filed in the Korean Industrial Property Office on Jan. 28, 1997 and there duly assigned Serial No. 2354/1997.

BACKGROUND OF THE INVENTION

1. Field of the Invention

The present invention relates to a hard disk drive, and more particularly to a technique for regulating current supplied for the unlatch operation when unlatching a head of a hard disk drive.

2. Description of the Related Art

In general, a hard disk drive(hereinbelow, referred to as HDD) widely used as an auxiliary memory device in a computer system is largely divided into two parts. A first part is a circuit part assembly(generally, called PCBA; Printed Circuit Board Assembly)on which most circuit components are mounted and a second part is a mechanism part assembly (generally, called HDA; Head Disk Assembly) which is equipped with most mechanism components including a head and a magnetic disk as well as a part of the circuit components.

In a hard disk drive assembly, a disk is rotatably mounted on a spindle motor and information is accessed by means of a read/write head mounted on an actuator arm which is rotated by a voice coil motor. Also, data transmitted from a host computer is recorded in the form of magnetic data on the disk by means of the same head. When the disk rotates at a constant speed, the head floats to a uniform height over the surface of the disk to record or reproduce data. The head is fixed at one side of the front end of the actuator and an iron piece is fixed to the other side thereof. The actuator is also supported by a pivot bearing and moves over the disk radially around the shaft of the pivot bearing under the control of the voice coil motor. A coil of the voice coil motor is mounted between the pivot bearing and the iron piece in the actuator. On both sides of the actuator, outer and inner crash stoppers are installed. The outer crash stopper is installed on a base so that the head can be prevented from deviating from the tracks on the disk and the inner crash stopper or a magnet comes into contact with the iron piece fixed to the other end of the actuator due to the magnetic force therebetween when the hard disk drive is not used so that the actuator can be fixed. These crash stoppers determine the movement range of the actuator, that is, the head stroke. The head stroke is the movement distance between the outermost circumferential region and the innermost circumferential region where the head is movable by the actuator over the disk.

In a multi-platter system, two or more disks are provided with a head for each respective surface of each disk.

The hard disk drive allows a head to be selectively positioned over any one desired track of the tracks on the disk by means of a servo mechanism. The positioning of the head over the specific track is normally performed by two servo control mode operations including a track seek operation and a track following operation. The track seek operation, which is generally called a seek mode, is the operation for moving a head from the present track to the desired track while the following operation, which is generally called a following mode, is the operation for enabling a head to accurately follow the sought track.

For the track seek and track following operations as well as the read and write operations of data, each track on the surface of a disk has a sector format including a data sector and a servo sector alternately disposed on a track corresponding to each head. The servo sector is prepared for the servo control of the track seek and following operations and the data sector is prepared for the writing of user data.

If the operation mode of the hard disk drive is switched from a latched non-operation state into an operating state, a microcontroller controls the head parked in a parking zone in such a manner that the head moves toward a data zone on the disk.

If the hard disk drive is in the operation state, the microcontroller controls the spindle motors so that it could be rotated at a constant speed and when the motor is rotated at a constant speed, the microcontroller enables the actuator to be moved from the parking zone toward the data zone with the actuator overcoming the latch force (magnetic force) of the magnet by supplying a square wave current of a uniform size to the actuator. The moving of the head from the parking zone to the data zone is called the unlatching operation. In such an unlatching operation, only a predetermined square wave of a uniform size is supplied at the acceleration and deceleration edges of the square wave.

After applying an unlatching current in the forward and reverse directions, the speed of the head is checked. In such an unlatching operation, the application of the unlatching current is accomplished with an open loop.

In such an unlatching operation, there has been a problem in that after the head is unlatched, the speed of the head may be greater or less than a desired value, thereby causing the unlatching operation to be unstable. The main cause of the variation of the speed of the head is that the latch force of the magnet may not be identical for each hard disk drive and may vary to a certain extent due to time or environmental factors even for one hard disk drive.

The following patents each disclose features in common with the present invention but do not teach or suggest the specifically recited technique for regulating the current supply for non-latch operation when unlatching a head of a hard disk drive: U.S. Pat. No. 5,305,160 to Funches et al., entitled Compensating For Variations In Torque Capability Of Voice Coil Motors, U.S. Pat. No. 5,305,161 to Giovanetti et al., entitled Adaptive Track Seeking For Disk Drives, U.S. Pat. No. 5,392,174 to Suzuki, entitled Method And Apparatus For Controlling The Speed Of Movement Of The Head Of A Disk Drive Apparatus To A Target Track, U.S. Pat. No. 5,675,558 to Katoh, entitled Seeking Control Apparatus And Method For Disk Drives, Using Slew-Rate Limit For Control Output, U.S. Pat. No. 5,521,891 to Nakane, entitled Speed Detection Apparatus, Speed Control Motor, And Track Jump Control Circuit, U.S. Pat. No. 5,465,034 to Andrews Jr. et al., entitled Low Acoustic Noise Seeking Method And Apparatus, U.S. Pat. No. 5,291,110 to Andrews Jr. et al., entitled Low Acoustic Noise Seeking Method And Apparatus, U.S. Pat. No. 5,600,219 to Gomez, entitled Sensorless Closed-Loop Actuator Unlatch, U.S. Pat. No. 5,384,675 to Crawforth et al., entitled Disk Drive With Controlled Actuator Oscillation For Release Of Head Carriers, U.S. Pat. No. 5,341,259 to Amirkiai et al., entitled Pivoting, Dual State Magnetic Latch For Disk File Actuator, and U.S. Pat. No. 5,568,333 to Bang, entitled Actuator Latching Device Of Hard Disk Drive.

SUMMARY OF THE INVENTION

It is therefore an object of the present invention to provide an unlatch control technique for enabling the HDD to perform a track following sequence well with a stable head speed being maintained to after a head is unlatched.

It is another object of the present invention to provide an unlatch control technique for stably performing the unlatching operation of a head by adjusting the unlatching deceleration current.

This and other objects of the present invention have been attained by providing a method of controlling the unlatching operation of a head in a HDD, by: detecting servo information written in a sector on a predetermined track of a disk when controlling the unlatching operation of the head; calculating the speed of the head which is unlatched by using said servo information; and adjusting the unlatching current depending on the head speed.

The "unlatching current" is defined as the current which is supplied to the actuator when the head is unlatched, and the "unlatching deceleration current" is defined as the current which is supplied to the actuator for decelerating the speed of the head when the head is unlatched.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
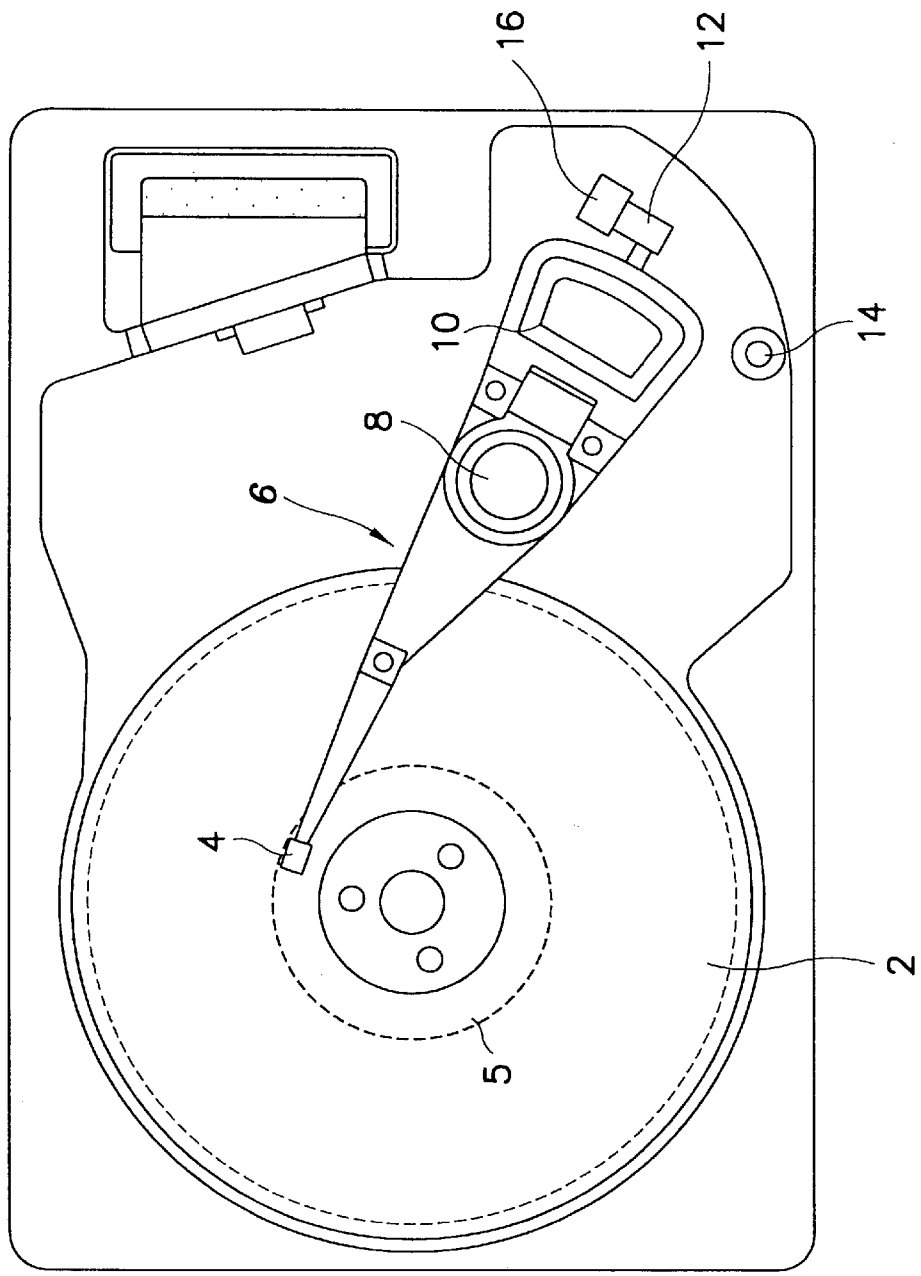
FIG. 1 is a schematic plan view illustrating a hard disk assembly.

Now, a preferred embodiment of the present invention will be described in detail with reference to the accompanying drawings. Throughout the drawings, it is noted that the same reference numerals or letters will be used to designate like or equivalent elements having the same function. The detailed descriptions on known functions and constructions unnecessarily obscuring the subject matter of the present invention have been avoided. Technical terms as will be mentioned hereinbelow are terms defined in consideration of the function in the present invention, which may be varied according to the intention of user, so the terms should be defined based on the contents of this specification.

FIG. 1 is a schematic plan view illustrating a mechanism construction of a hard disk assembly.

Referring to FIG. 1, the disk 2 is rotatably mounted on a spindle motor and information is accessed by means of read/write head 4 that is mounted on an actuator 6 arm which is rotated by a voice coil motor. Also, data transmitted from a host computer is recorded in the form of magnetic data on the disk 2 by the head 4. When the disk 2 rotates at a constant speed, the head 4 floats to a uniform height over the surfaces of the disk 2 to record or reproduce data. The head 4 is fixed at one side front end of the actuator 6 and an iron piece 12 attracted well by a magnet is fixed to the other side thereof. The actuator 6 is also supported by a pivot bearing 8 and moves over the disk 2 radially around the shaft of the pivot bearing 8 under the control of a voice coil motor (hereinbelow, referred to as a VCM). A coil 10 of the VCM is mounted between the pivot bearing 8 and the iron piece 12 in the actuator 6. In FIG. 1, on both sides of the actuator 6, outer and inner crash stoppers 14 and 16 are installed. The outer crash stopper 14 is installed on a base so that the disk 2 can be prevented from deviating from tracks on the disk 2, and the inner crash stopper or a magnet 16 comes into contact with the iron piece 12 fixed to the other end of the actuator 6 due to magnetic force when the HDD is not used so that the actuator 6 can be fixed. These crash stoppers 14 and 16 determine the movement range of the actuator 6, i.e., the head stroke. The head stroke is the movement distance between the outermost circumferential region and the innermost circumferential region where the head 4 is movable by the actuator over the disk 2. In FIG. 1, there is shown the state in which the actuator 6 is latched by means of the magnet 16, the head 4 being parked at a parking zone 5.

Figure 2:
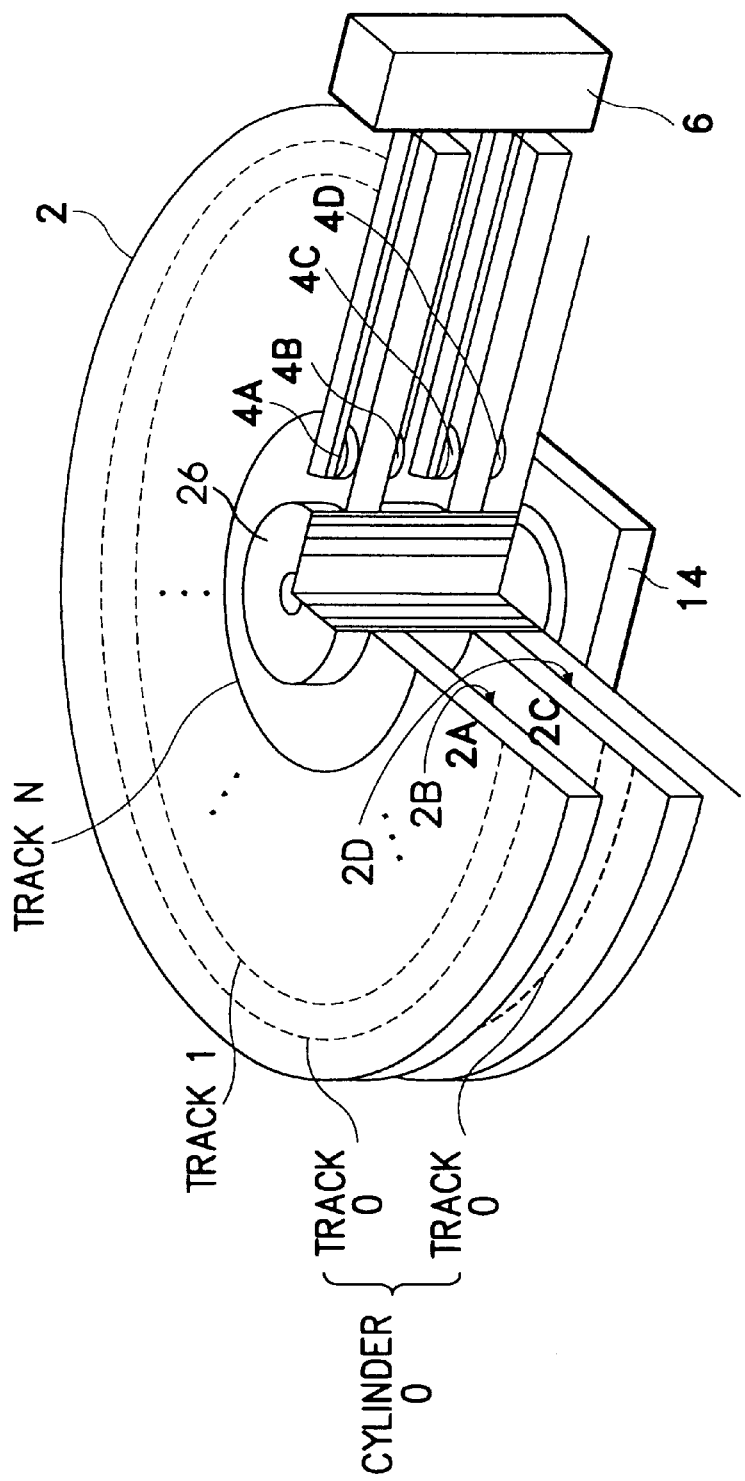
FIG. 2 is a partial sectional view illustrating disks in a hard disk drive employing a multi-platter system.

FIG. 2 illustrates a partial sectional view of disks 2 in a HDD employing a multi-platter system. The multi-platter system is employed in order to maximize the storage capacity of data. Referring to FIG. 2, two disks 2 which normally assume the form of a stack are rotatably mounted on a driving is shaft of a spindle motor 26, and there is typically each of heads 4A,4B,4C and 4D for each disk surface 2A,2B,2C and 2D. The heads 4A,4B,4C and 4D are positioned on each surface 2A,2B,2C and 2D of the disks 2, respectively and installed at one end of a horizontally extended actuator arm of an actuator 6. A predetermined number of tracks are disposed concentrically on each surface 2A,2B,2C and 2D of the disks 2, and each track is allocated a corresponding track number(track 0–track N). Tracks having numbers on each disk surface 2A,2B,2C and 2D corresponding to each of heads 4A,4B,4C and 4D are generally called a cylinder. Therefore, the identical track number between the disks is defined as one cylinder number. For example, all of track numbers, "track 0" on each disk surface 2A,2B,2C and 2D corresponding to each of heads 4A,4B,4C and 4D is a "cylinder number 0".

The HDD allows a head to be selectively positioned over any one desired track of the tracks on the disk by means of a servo mechanism. The positioning of the head over the specific track is normally performed by two servo control mode operations including a track seek operation and a track following operation. The track seek operation, which is generally called a seek mode, is the operation for moving a head from the present track to the desired track. The track following operation, which is generally called a following mode, is the operation for enabling a head to A accurately follow the sought track. Once the head is positioned over a predetermined track, it is desirable to maintain the head on the centerline of the track so as to accurately read and write data.

Figure 3:
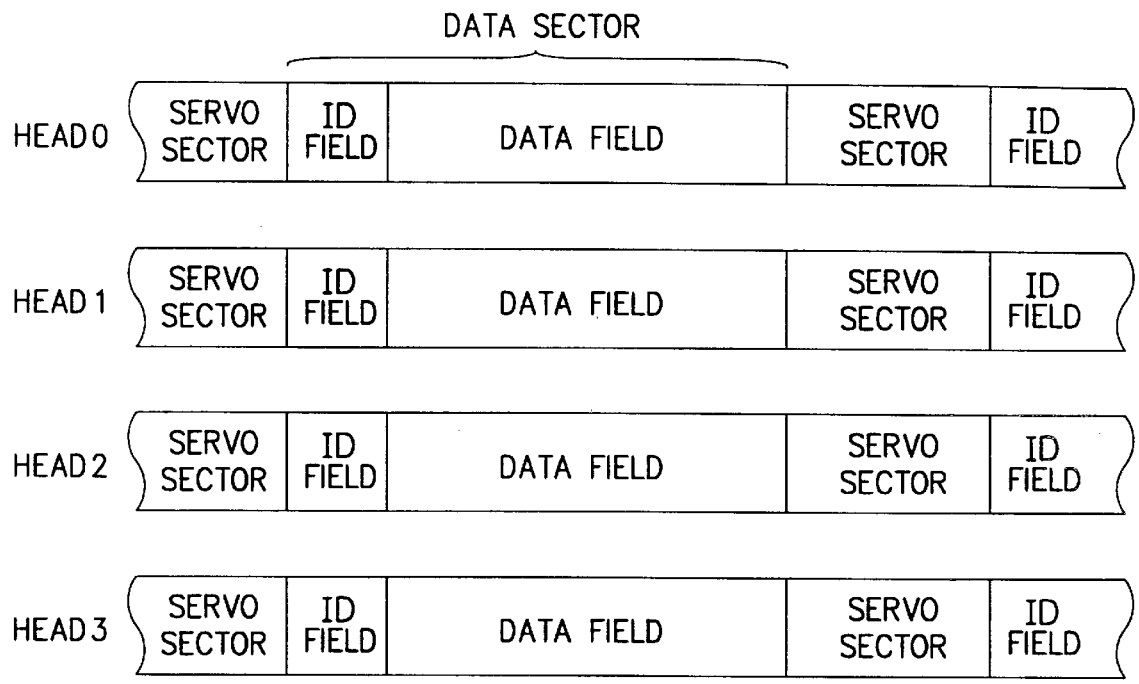
FIG. 3 is a sector format diagram illustrating a servo sector and a data sector alternately positioned on each track of the surface of a disk.

For the track seek and track following operations as well as the read and write operations of data, each track on the surface of a disk has a sector format as shown FIG. 3. FIG. 3 illustrates an example of a sector format for four tracks existing on the same cylinder of a disk corresponding to each track in a HDD employing two disks.

Referring to FIG. 3, a servo sector and a data sector are alternately disposed on a track corresponding to each head (head 0, head 1, head 2 and head 3). The servo sector is prepared for the servo control of track seek and track following operations, etc. and the data sector is prepared for the writing of user data. The servo sector generally occupies 9–11% of total storage capacity of a disk.

In FIG. 3, the data sector is normally divided into an identification field(hereinbelow, referred to as ID field) and a data field. Header information for identifying a relevant data sector is written in the ID field, and digital data is written in the data field. A servo sector is positioned immediately before and after a data sector.

Figure 4:
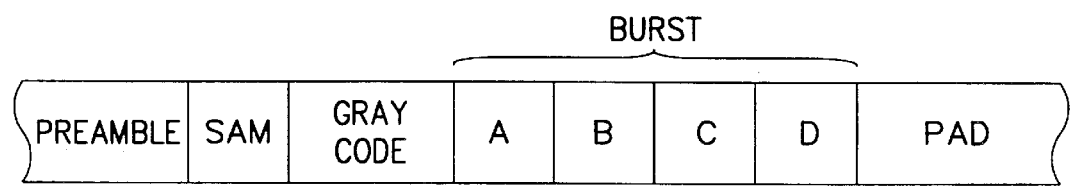
FIG. 4 is a detailed servo sector format diagram illustrating a servo burst pattern and other servo sector information recorded on the servo sector in FIG. 3.

FIG. 4 illustrates in detail servo sector information recorded in the servo sector in FIG. 3.

A detailed description of the servo sector information recorded in the servo sector will be hereinafter described with reference to FIG. 4.

The servo sector includes a preamble, Servo address mark(hereinbelow, referred to as a SAM), gray code, A,B,C and D bursts and PAD in a typical track layout. The preamble, which is called a "servo sync", provides a clock sync during the reading of servo information as well as provides a gap at the front part of the servo sector to represent that a relevant sector is a servo sector. The SAM indicates the start of servo and then provides a sync for reading the gray code written in the servo sector information area immediately following the SAM. That is, the SAM functions as a reference point for producing various timing pulses connected with servo control. The gray code provides information on each of the tracks, ie., track number. The A,B,C and D bursts provides a position error signal (hereinbelow, referred to as a PES) required for track seek and track following operations. Lastly, the PAD provides a transition margin from the servo sector to the data sector.

Figure 5:
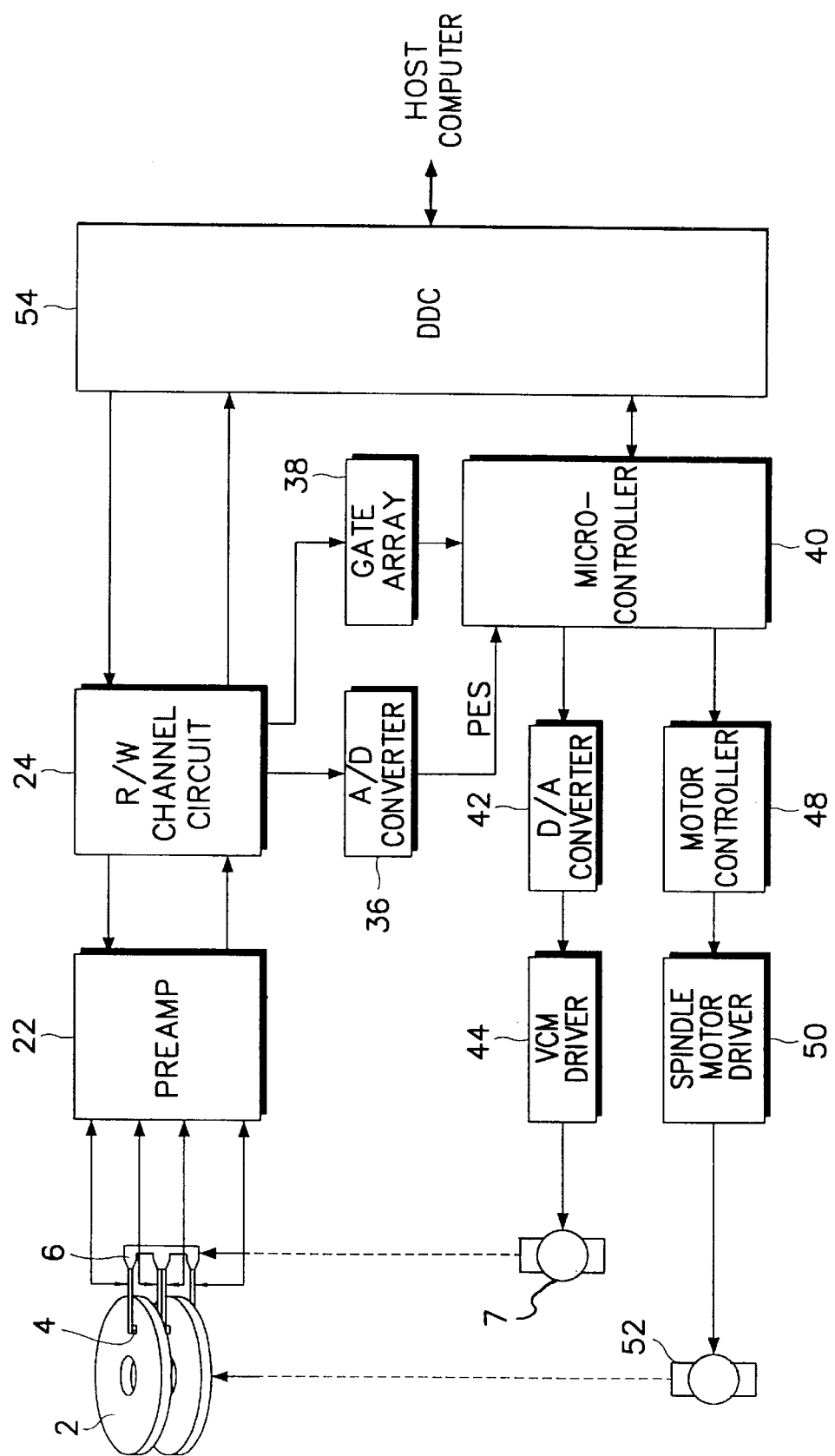
FIG. 5 is a block diagram illustrating the inner construction of a hard disk drive employing a multi-platter system.

FIG. 5 illustrates a block diagram of the inner construction of an HDD including two disks 2 and four heads 4 corresponding thereto.

Referring to FIG. 5, disks 2 which normally assumes the form of a stack are rotatably mounted on a driving shaft of a spindle motor 52, and there is typically a single magnetic head 4 for each disk surface. The magnetic head 4 is positioned on a surface of the magnetic disk 2 and installed at one end of an extended actuator arm of an actuator arm assembly 6 having a rotary voice coil motor 7 (hereinbelow, referred to as a VCM). During the read operation of data, a pre-amplifier 22 which is coupled to a read/write (hereinbelow, referred to as R/W)channel circuit 4 pre-amplifies a read signal picked up by one of the heads 4 to provide it to the R/W channel circuit 24, and during the write operation of data, enables encoded write data supplied from the R/W channel circuit 24 to be written on the surface of the disk 2 through the driving of a corresponding one of the heads 4. At this time, the pre-amplifier 22 selects one of the heads 4 under the control of a disk data controller 54(hereinbelow, referred to as a DDC).

The R/W channel circuit 24, which is coupled to the pre-amplifier 22, an analog-digital converter (hereinbelow, referred to as an A/D converter) 36 and the DDC 54, decodes the read signal supplied from the pre-amplifier 22 and generates read data RDATA to provide it to the DDC 54, and encodes write data WDATA supplied from the DDC 54 to provide the encoded data to the pre-amplifier 22. Further, the R/W channel circuit 24 demodulates head position information which is a part of servo information written on the disk 2 to generate a position error signal(hereinbelow, referred to as a PES). The PES generated from the R/W channel circuit 24 is provided to the A/D converter 36, which in turn converts the PES supplied thereto into a digital value corresponding to its level to provide the converted signal value to a microcontroller 40. The DDC 54 transmits data received from a host computer through the R/W channel circuit 24 and the pre-amplifier 22 to the surface of the a disk 2, in response to data read/write command received from the host computer, or transmits the data read from the disk 2 to the host computer. Additionally, the DDC 54 interfaces the communications between the host computer and the microcontroller 40 as well as between the host computer and the R/W channel circuit 24. The microcontroller 40 which is coupled to the DDC 54 controls the DDC 54 in response to data read/write commands received from the host computer, and controls track seek and track following operations. The microcontroller 40 controls the aforementioned track following operation by using the PES value supplied from the A/D converter 12, and executes the servo control operation in correspondence with various signals related to servo control from a gate array 38. A digital-analog converter (hereinbelow, referred to as a D/A converter) 42 receives a digital control output signal for controlling the position of the head 4 generated from the microcontroller 40, converts the received signal into analog data, and finally outputs the converted data to the VCM driver 44. The VCM driver 44 receives a value for servo control(the control of the head position)of the microcontroller 40 through the D/A converter 42 and then generates driving current for driving the actuator 6 to provide the current to the VCM 7 of the actuator 6. Disposed on one end of an actuator arm is the VCM 7 and the heads 4 are attached to the other end thereof. Also, the VCM 7 of the actuator 6 moves the head 4 horizontally over the track on the magnetic disk 2 in correspondence with the direction and the level of the driving current supplied from the VCM driver 44. A motor controller 48 controls the spindle motor driver 50 according to a control value for the rotation control of the disk 2 under the control of the microcontroller 40. The spindle motor driver 50 controls the driving of the spindle motor 52 under the control of the motor controller 48, and the spindle motor 52 enables the disk 2 to be rotated under the control of the spindle motor driver 50. The A/D converter 36 converts the PES based on the burst signal from the servo information supplied through the R/W channel circuit 24 into a digital signal and outputs the converted signal to the micro-controller 40. The gate array 38 generates various timing signals required for the read/write operation, decodes servo information and supplies the decoded servo information to the microcontroller 40.

Such an HDD allows the head 4 to be parked in a parking zone 5 during the non-operation. As described above with reference to FIG. 1, an iron piece 12 mounted to the other side end of the actuator 6 comes into contact with the side of the magnet 16. The iron piece 12 and the magnet 16 functions as a latch, and such a state is called a "latch state".

If the operation mode of the HDD is switched from this non-operation state into the operation state, the microcontroller 40 in FIG. 5 controls the head 4 parked in the parking zone as shown in FIG. 1 in such a manner that the head 4 moves toward a data zone on the disk 2.

Now, an explanation on the unlatching operation of the head of the HDD will be given hereinafter with reference to FIGS. 1 and 5.

If the HDD is in the operation state, the micro-controller 40 controls the spindle motor 52 0so that it can be rotated at a constant speed. When the spindle motor 52 is rotated at a constant speed, the micro-controller 40 enables the actuator 6 to be moved from the parking zone toward the data zone with the actuator 6 overcoming the latch force(magnetic force) of the magnet 16 by supplying a square wave current of a uniform size to the actuator 6 through the VCM driver 44. The moving of the head from the parking zone to the data zone is called the unlatching operation. An example of the square wave current(hereinbelow, referred to as an unlatching current) supplied to the actuator 6 during the unlatching operation is shown in FIG. 6.

Figure 6:
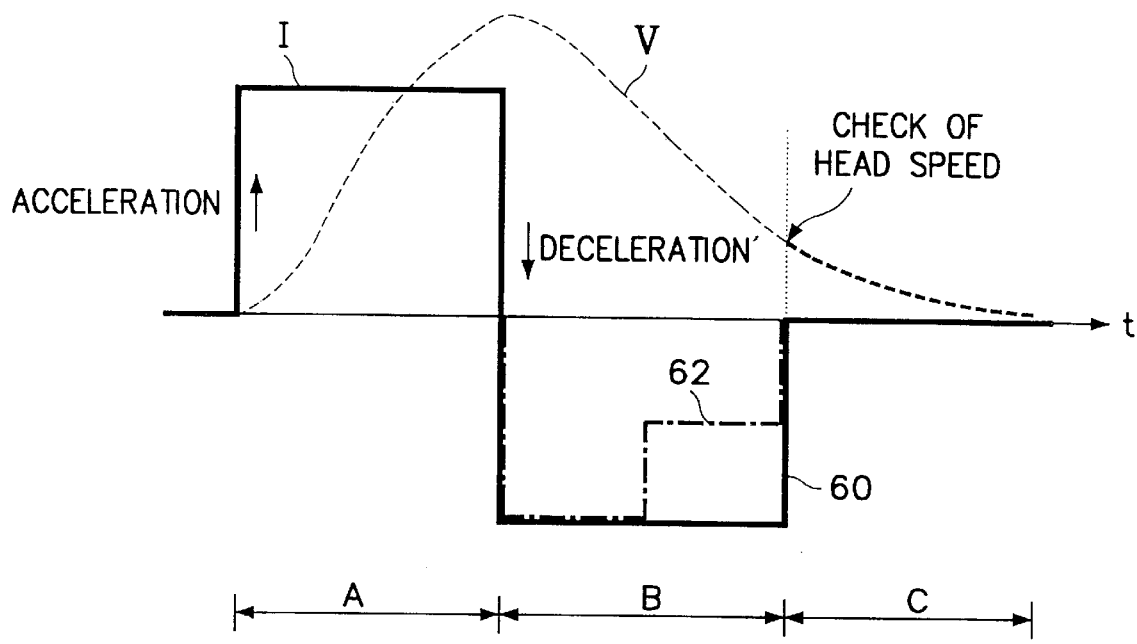
FIG. 6 illustrates the waveform chart of unlatching current and the time when head speed is to be checked in accordance with earlier arrangements.

FIG. 6 illustrates the waveform chart of unlatching current I and the time when the head speed V is to be checked in accordance to the earlier arrangement.

Referring to FIG. 6, the waveform of the unlatching current I consists of a square wave of a uniform size. For this reason, at the early stage of the unlatching operation, the head 4 is moved from the parking zone to the data zone by supplying a forward current(acceleration edge of edge A in FIG. 6 )to the actuator 6 so that the actuator 6 can overcome the latch force(magnetic force) of the magnet 16, and after that, a reverse current (deceleration edge of edge B in FIG. 6) is supplied to the actuator 6 so that the speed of the head 4 can be decelerated.

In such an unlatching operation, only the predetermined square wave current of a uniform size, i.e., the unlatching current, is supplied at the acceleration edge A and the deceleration edge B. The unlatching current I of 1 A is supplied in the forward direction for 7 ms at the acceleration edge A, and the unlatching current I of 0.7 A is supplied in the reverse direction for 10 ms at the deceleration edge B like the case of waveform 60 (or the unlatching current I of 0.7 A is supplied in the reverse direction for 5 ms and then 0.4 A for 5 ms at the deceleration edge B like the case of waveform 62). After that, the speed of the head 4 is checked at edge C. To be brief, in the unlatching operation, the application of the unlatching current is accomplished with an open loop.

In the aforementioned unlatching operation, there has been a problem in that after the head 4 is unlatched, the speed of the head 4 may be greater than a desired value or less than a desired value, causing the unlatching operation to be unstable. The main cause of the variation in the speed of the head 4 is that the latch force (magnetic force) of the magnet 16 in FIG. 1 may not be identical for each HDD, and may vary to a certain extent due to time or environmental factors even for one HDD.

Figure 7:
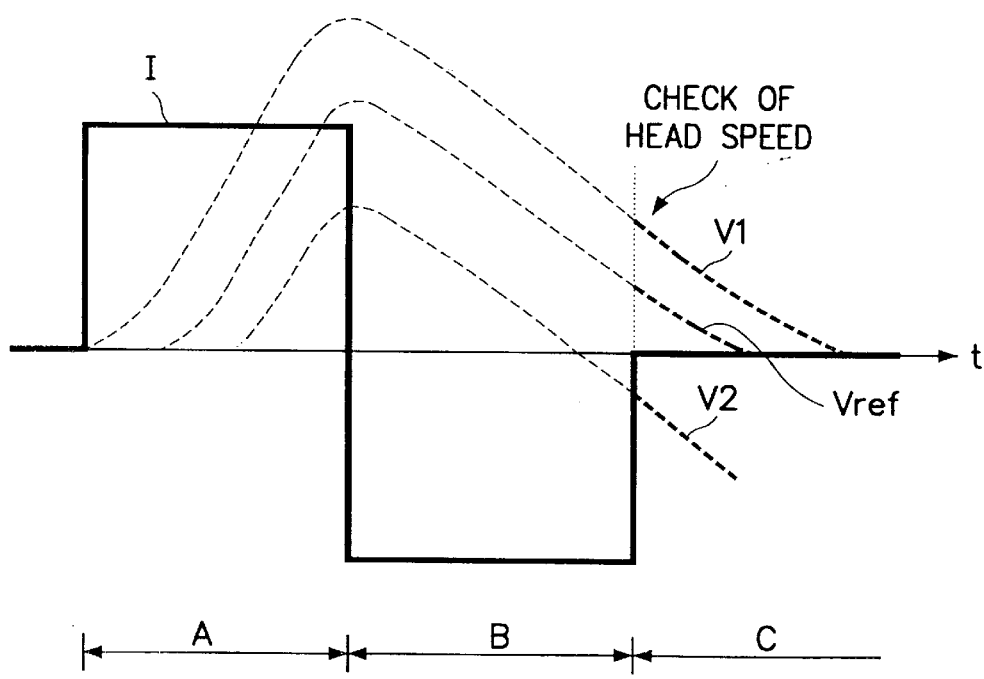
FIG. 7 illustrates the problems of the unlatching operation when performed in accordance with earlier arrangements.

FIG. 7 illustrates the problems of the unlatching operation in accordance with the earlier arrangement. In FIG. 7, the speed of head 4 is measured at edge C. As a result, if it is determined that the speed of head 4 is V1 which is greater than a desired speed value $V_{ref}$, a sequence following subsequently can not be performed. Meanwhile, if it is determined that the speed of head 4 is V2 which is less than a desired speed value $V_{ref}$, the head 4 is parked again due to latch force (magnetic force) of the magnet 16 in FIG. 1.

In the control of the unlatching operation of a head 4 according to an embodiment of the present invention, when servo information is searched and detected at acceleration edge A and deceleration edge B, the speed of the head can be calculated by using the servo information. After that, it is determined whether or not the speed value of the head obtained is a stable value. If the speed value of the head is not a stable value, the unlatching current is adjusted so that the speed of the head 4 can be stable.

The configuration of a disk 2 is described hereinbelow with reference to FIG. 1. The surface of the disk 2 is largely divided into a parking zone 5, an inner-guard band zone positioned on a circumference adjacent to the parking zone 5, a user data zone positioned on a predetermined number of tracks in the next circumference and an outer-guard band zone positioned on an outermost circumference. Written on all the zones is servo information(may not be written on the parking zone) as shown in FIG. 4, and particularly, servo information as well as data information in FIG. 3 is written on the user data zone.

Therefore, in the control of the unlatching operation according to an embodiment of the present invention, the speed of the head 4 can be obtained by reading gray code in servo information written in the inner-guard band zone, the data zone and the outer-guard band zone.

Figure 8:
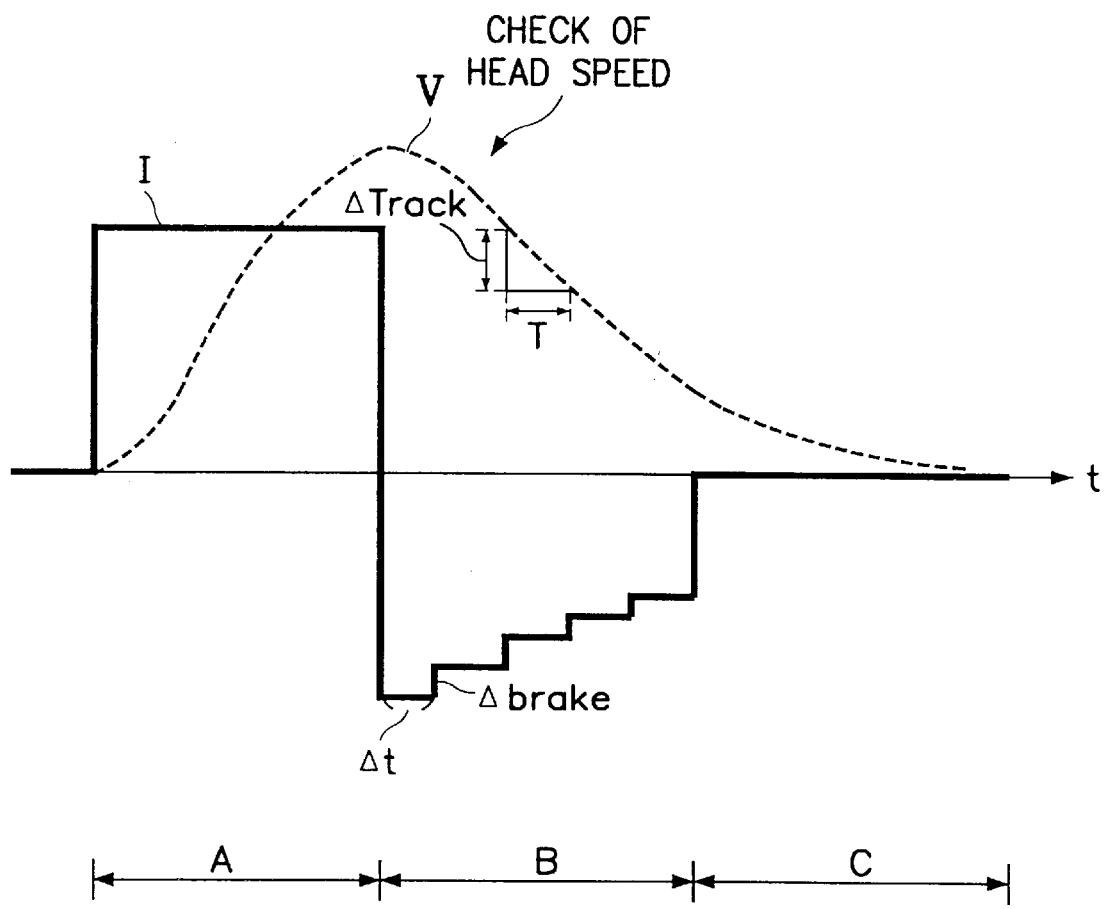
FIG. 8 illustrates the waveform chart of the unlatching current and the time when the speed of a head is to be checked in accordance to a preferred embodiment of the present invention.

FIG. 8 illustrates the waveform chart of the unlatching current and the time when the speed of the head 4 is to be checked in accordance to a preferred embodiment of the present invention.

Referring to FIG. 8, the check of the head speed is immediately executed at acceleration edge A and deceleration edge B. However, since it is almost impossible to search and detect the servo as information at the acceleration edge A, the check of the head speed can not substantially be performed at the edge A, Thus, the speed of the head 4 is checked at the deceleration edge B. If the speed of the head 4 is not checked even at the deceleration edge B, the speed of the head 4 is checked at the edge(hereinbelow, referred to as a "polling time edge") C immediately following the deceleration edge B. By this means, when the speed of the head 4 is checked, the unlatching deceleration current is adjusted for stabilizing the head speed.

Figure 9A:
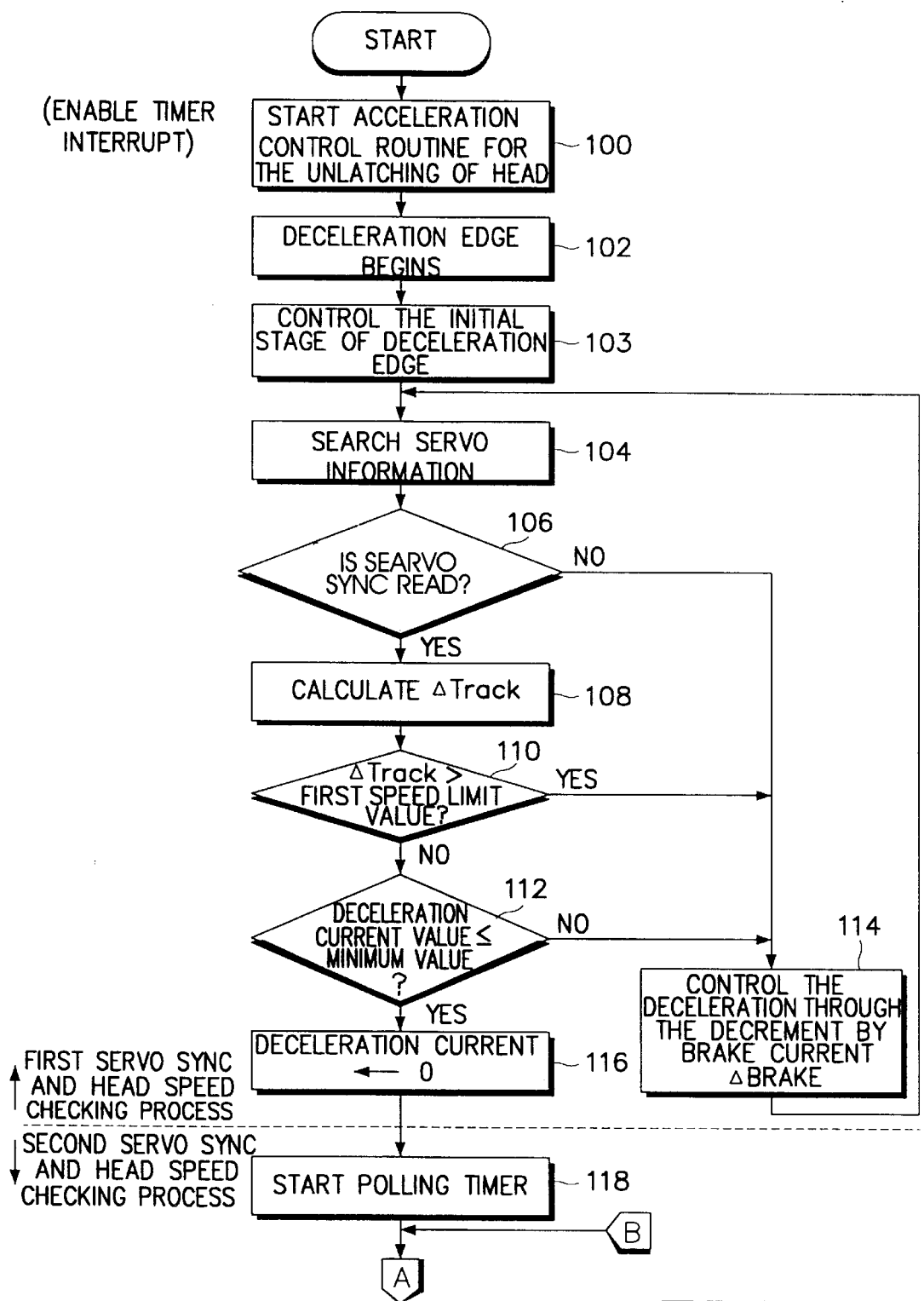
FIGS. 9A and 9B together form a flowchart illustrating a process routine for adjusting the unlatching current in accordance with a preferred embodiment of the present invention.
Figure 9B:
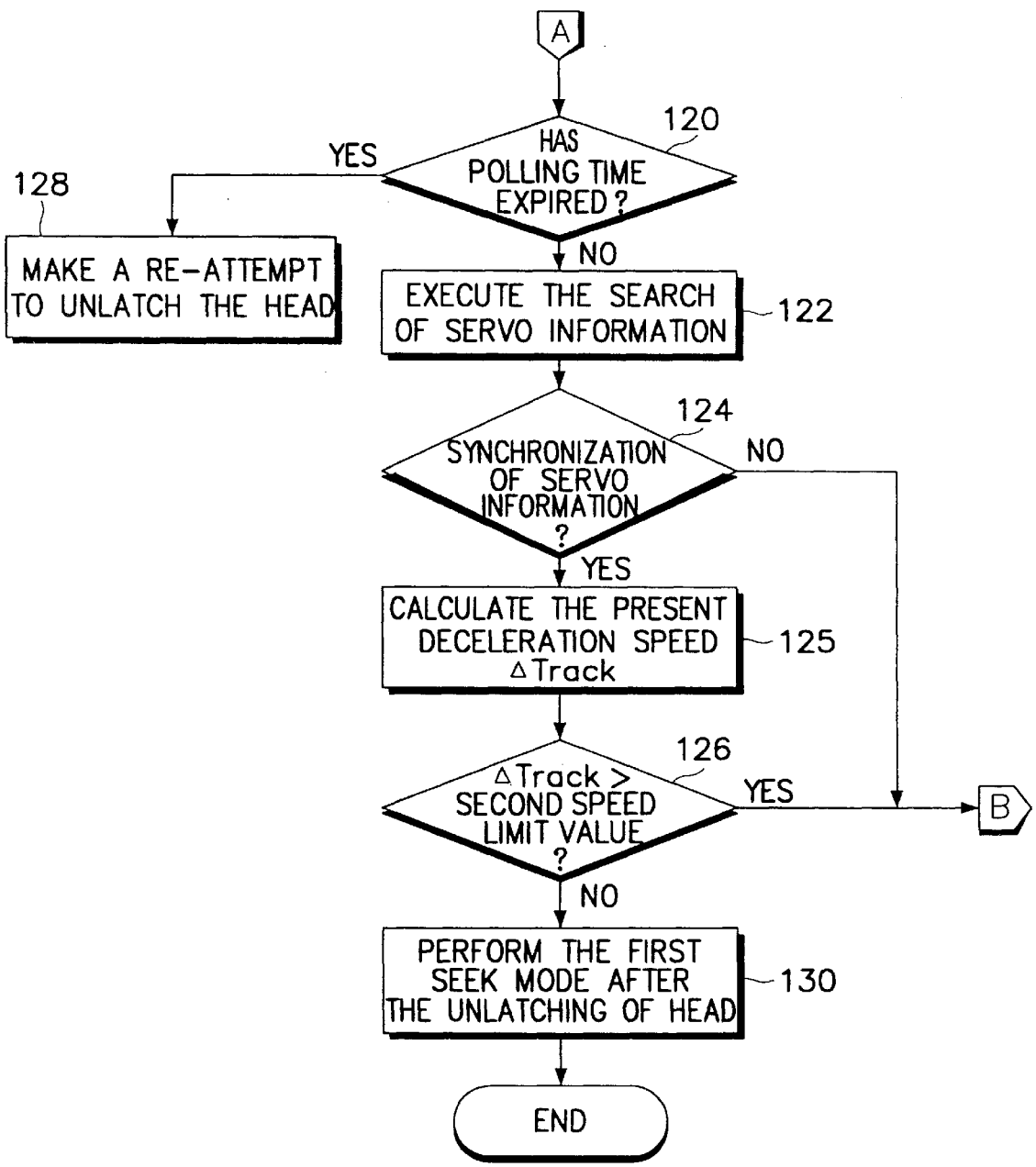

FIGS. 9A and 9B together form a flowchart illustrating a process routine for adjusting unlatching current in accordance with a preferred embodiment of the present invention.

A detailed explanation on the unlatching control operation according to an embodiment of the present invention follows hereinafter with reference to FIGS. 5, 8, 9A and 9B.

To be brief, in a first servo sync and head speed checking process including the process steps 100 through 116 in FIG. 9A, if the servo information is not synchronized, even in case of "an unlatching deceleration current value <a minimum value" in step 12 or if "ΔTrack>a first speed limit value" in step 110, the unlatching deceleration current value is forcibly set to "0". And then, a second servo sync and head speed checking process is executed. The second servo sync and head speed checking process including the process steps 118 in FIG. 9A through 114 in FIG. 9B, is carried out in the same manner a as the first servo sync and head speed checking process except that a brake current value or Δbrake is decremented gradually. In a normal case (i.e., in the first servo sync and head speed checking process, when the conditions are satisfied), the servo information is checked once more, and in an abnormal case (i.e., in the first servo sync and head speed checking process, when the conditions are not satisfied or a failure), a re-attempt to unlatch a head is made.

Referring now to FIGS. 9A and 9B, at step 100, a microcontroller 40 starts the acceleration control routine for the unlatching of the head. Namely, if the operation mode of a HDD is switched from a non-operation state to a operation state, the microcontroller 40 controls a spindle motor 52 so that it can be rotated at a constant speed. When the spindle motor 52 is rotated at a constant speed, the microcontroller 40 enables the actuator 6 to be moved from a parking zone 5 toward a data zone with the actuator 6 overcoming the latch force (magnetic force) of the magnet 16 by supplying a forward unlatching current I (e.g., 1 A, for 7 ms) of a uniform size for acceleration at edge A in FIG. S8 to the actuator 6 through the VCM driver 44. The microcontroller 40 enables a timer interrupt at an acceleration start point, edge A of the unlatching current I. According to this, the timer interrupt is performed every servo sampling period (e.g., 154.3,us). Therefore, the search of servo information, step 106 is executed every servo sampling period. However, since the speed of the head is too high at the edge A, it is almost impossible to search servo information.

At step 102, if the deceleration edge B begins, the program proceeds to step 103 at which the microcontroller 40 controls the initial stage of the deceleration edge. That is, the microcontroller 40 allows the head 4 to be decelerated by supplying a reverse unlatching current of 1 A (hereinbelow, referred to as an "unlatching initial brake current") for deceleration as shown in the initial stage of edge B in FIG. 8 for 1.27 ms(=Δt). Also, at this time, during step 104 a search of servo information is executed every servo sampling period. Then, it is determined at subsequent step 106 whether or not the servo information is synchronized. If YES, i.e., if the servo information is synchronized, the program proceeds to step 108 at which the micro-controller 40 calculates the deceleration speed of the head 4 through the reading of gray code(information on each of the tracks, i.e., track numbers) in the synchronized servo information. The deceleration speed can be calculated according to the following formula (1):

$$\text{the deceleration speed} = \frac{\Delta \text{Track}}{T} \qquad (1)$$

$$= \frac{\text{the previous gray code} - \text{the present gray code}}{T}$$

where, T=servo sampling period

ΔTrack=a distance between the previous track and the present track

As shown in the above formula (1), since the deceleration speed can be represented by ΔTrack, it will be expressed as ΔTrack hereinafter. Thus, the deceleration speed ΔTrack becomes "the previous gray code- the present gray code". The microcontroller 40 calculates the deceleration speed ΔTrack by subtracting the present gray code from the previous gray at step 108. Then, the program proceeds to step 110 where it is determined whether or not the deceleration speed ΔTrack exceeds the first predetermined speed limit value. In an embodiment according to the present invention, it is desirable that the first predetermined speed limit value is set to "5 tracks". If it is determined at step 110 that the deceleration speed ΔTrack exceeds the first predetermined speed limit value, the program proceeds to step 114 where the microcontroller 40 performs the deceleration as4 control through the decrement by a brake current value Δbrake in the unlatching initial brake current(=1 A). In an embodiment according to the present invention, it is desirable that the brake current value Δbrake is set to "12 mA". Then, the program returns to step 104 from which the process steps 104 through 112 are executed again. If the process steps 104 through 112 are re-executed, the deceleration current I is decreased continuously step by step as shown in FIG. 8, thus causing the deceleration speed ΔTrack to be decreased gradually. As a result, the deceleration speed ΔTrack becomes less than the first predetermined speed limit value. If, on the other hand, it is determined at step 110 that the deceleration speed ΔTrack doesn't exceed the first predetermined speed limit value, the program proceeds to step 112 where the microcontroller 40 checks whether or not the present deceleration current I is less than the predetermined minimum value. The minimum value is a reference value representing that the speed of the head 4 is sufficiently stable. If the present deceleration current I is determined to be larger than the predetermined minimum value at step 112, the program proceeds to step 114 at which the microcontroller 40 performs the deceleration control through the decrement by a brake current value Δbrake, and then the program returns to step 104 from which the process steps 104 through 112 are executed again. On the other hand, if the present deceleration current I is determined to be equal to or less than the predetermined minimum value at step 112, the program proceeds to step 116 at which the microcontroller 40 sets the deceleration current I to "0" forcibly.

After that, a second servo sync and head speed checking process is executed which includes the process steps 118 in FIG. 9A through 126 in FIG. 9B. The second servo sync and head speed checking process is carried out at the polling time edge C as shown in FIG. 8. As previously described, the second servo sync and head speed checking process is carried out in the same manner i) as the first servo sync and head speed checking process except that a brake current value, Δbrake is decremented gradually.

More specifically, at step 118 in FIG. 9A, the microcontroller 40 enables a polling timer to be started. At subsequent step 120, it is determined whether or not the polling time has expired. If the polling timer has not expired, the program proceeds to step 122 where the search of servo information is executed. After that, it is determined at step 124 whether or not the servo information is synchronized. If the answer is NO, the program returns to step 120. On the other hand, if it is determined that the servo information is synchronized, the program proceeds to step 125 in FIG. 9B where the microcontroller 40 calculates the present deceleration speed ΔTrack. And then, the program proceeds to step 126 where it is determined whether or not the present deceleration speed ΔTrack exceeds the second predetermined speed limit value. In an embodiment according to the present invention, it is desirable to set the second predetermined speed limit value to "5 tracks" which is the same value as the first predetermined speed limit value. If it is determined at step 126 that the present deceleration speed ΔTrack exceeds the second predetermined speed limit value, the program returns to step 120 where the microcontroller 40 performs continuously the deceleration control. The process steps 120 through 126 are executed in the aforementioned manner. Namely, if before the polling time has expired, the synchronization of servo information is accomplished and the present deceleration speed ΔTrack is not larger than the second predetermined speed limit value, the program proceeds to step 130 where the microcontroller 40 performs the first seek mode after the unlatching of the head 4. Thus, the second servo sync and head speed checking process routine is concluded. Meanwhile, if until the polling time has expired, the synchronization of servo information is accomplished and the present deceleration speed ΔTrack is larger than the second predetermined speed limit value, i.e., if it is determined at step 120 that the polling time has expired, the program proceeds to step 128 where the microcontroller 40 makes a re-attempt to unlatch the head.

As described above, the present invention has an advantage that since the unlatching current can be adjusted through the feedback process of the head speed in the control of the unlatching operation, more stable unlatching operation is accomplished.

While there have been illustrated and described what are considered to be preferred embodiments of the present invention, it will be understood by those skilled in the art that various changes and modifications and equivalents may be substituted for elements thereof without departing from the true scope of the present invention. Therefore, it is intended that the present invention not be limited to the particular embodiments disclosed as the best mode contemplated for carrying out the present invention, but that the present invention embraces all alternatives, modifications and variances falling within the scope of the appended claims.

What is claimed is:

1. A method of controlling the unlatching operation of a head in a hard disk drive, comprising the steps of:

detecting servo information written in a sector on a predetermined track of a disk having a plurality of tracks when controlling the unlatching operation of said head, said servo information comprising information stored within each of said tracks;

calculating said head speed of the head which is unlatched by using said servo information according to the following formula:

$$\text{the head speed} = \frac{\Delta \text{Track}}{T}$$
   $$= \frac{\text{a previous gray code} - \text{a present gray code}}{T}$$

where, T=servo sampling period and
   ΔTrack=a distance between the previous track and the present track; and adjusting an unlatching current depending on said head speed.

2. A method of controlling unlatching of a head in a hard disk drive, comprising the steps of:

detecting servo information written in a plurality of sectors on a plurality of tracks of a disk within said hard disk drive when controlling said unlatching of said head, with said servo information uniquely identifying a radial position of each track within an incrementally ordered serial array of said plurality of tracks borne by said disk, by reading said servo information from among said sectors within a data zone bearing a multiplicity of said tracks, from among said sectors within an inner-guard band zone circumferentially interposed between said data zone and a parking zone of said disk where said head rests while an armature bearing said head is held stationary, and from among said sectors within an outer-guard band zone that separates said data zone from an outer peripheral edge of said disk; and making a determination of head speed of the head by using said servo information; and adjusting an unlatching current in dependence upon said determination of head speed.

3. The method of claim 1, further comprised of adjusting said unlatching current by varying a deceleration component of said unlatching current.

4. The method of claim 1, with said unlatching current comprised of a first component exhibiting a first polarity during a first interval of said unlatching operation, and an unlatching deceleration current exhibiting a second and opposite polarity during a deceleration interval subsequent to said first interval.

5. The method of claim 4, further comprised of adjusting said unlatching current by changing said unlatching deceleration current.

6. A method of controlling an unlatching of ahead in a hard disk drive, comprising the steps of:

detecting servo information written in a sector on a predetermined track of a disk having a plurality of tracks when controlling the unlatching of said head;

calculating said head speed of the head which is unlatched by using said servo information; and at a deceleration edge of said head speed, adjusting an unlatching current being applied during said unlatching of the head in dependence upon said head speed.

7. The method according to claim 6, said servo information comprising information stored within each track.

8. The method according to claim 6, said head speed being calculated according to the following formula:

$$\text{the head speed} = \frac{\Delta \text{Track}}{T}$$
   $$= \frac{\text{a previous gray code} - \text{a present gray code}}{T}$$

where, T=servo sampling period and
   ΔTrack=a distance between the previous track and the present track.

9. A method of controlling the unlatching operation of a head in a hard disk drive, comprising the steps of:

supplying a forward unlatching current of a uniform size to an actuator on which said head is mounted during a regular time interval for unlatching said head;

accelerating the speed of said head;

supplying a reverse unlatching current of a uniform size to said actuator only during a predetermined time interval for deceleration control of said head after an established time has passed;

decelerating said head speed at an initial stage;

searching periodically servo information written in a sector on a predetermined track of a disk having a plurality of tracks;

detecting information on each track in said servo information;

calculating said head speed by using said information on each of said tracks;

decrementing gradually said reverse unlatching current by a predetermined brake current value if a value of said head speed is greater than the predetermined head speed limit value; and supplying said decremented reverse unlatching current to said actuator.

10. The method according to claim 9, the method further comprising the steps of:

performing the search of said servo information at a polling time edge immediately following a predetermined deceleration edge if said information on each of said tracks is not detected during said deceleration edge;

making a re-attempt to unlatch said head if the synchronization of said servo information is not accomplished in search of said servo information at said polling time edge.

11. The method according to claim 10, said head speed being calculated according to the following formula:

$$\text{the head speed} = \frac{\Delta \text{Track}}{T}$$

$$= \frac{\text{a previous gray code} - \text{a present gray code}}{T}$$

where, T=servo sampling period and

ΔTrack=a distance between the previous track and the present track.

12. An apparatus for controlling the unlatching operation of a head in a hard disk drive, comprising:

a detector for detecting servo information written in a sector on a disk having a plurality of tracks when controlling the unlatching operation of said head by detecting servo information written in a plurality of sectors on a plurality of tracks of a disk within said hard disk drive when controlling said unlatching of said head, with said servo information uniquely identifying a radial position of each track within an incrementally ordered serial array of said plurality of tracks borne by said disk, by reading said servo information from among said sectors within a data zone bearing a multiplicity of said tracks, from among said sectors within an inner-guard band zone circumferentially interposed between said data zone and a parking zone of said disk where said head rests while an armature bearing said head is held stationary and from among said sectors within an outer-guard band zone that separates said data zone from an outer peripheral edge of said disk; and a controller making a determination of a head speed of the head which is unlatched, by using said servo information, and periodically adjusting an unlatching current in dependence upon said head speed determined by using said servo information.

13. The apparatus according to claim 12, said servo information detected by said detector comprising information of each track.

14. The apparatus according to claim 13, said controller making said determination of said head speed according to the following formula:

$$\text{said head speed} = \frac{\Delta \text{Track}}{T}$$

$$= \frac{\text{a previous gray code} - \text{a present gray code}}{T}$$

where, T=a servo sampling period, and

ΔTrack=a distance between a previous track and a present track.

15. The apparatus according to claim 12, said controller adjusting the unlatching current at a deceleration edge of said head speed.

16. An apparatus for controlling the unlatching operation of a head in a hard disk drive, comprising:

a current source for supplying a forward unlatching current of a uniform size to an actuator on which said head is mounted during a regular time interval for unlatching said head;

a means for accelerating the speed of said head;

said current source supplying a reverse unlatching current of a uniform size to said actuator only during a predetermined time interval for deceleration control of said head after an established time has passed;

a means for decelerating said head speed at an initial stage;

a detector for searching periodically servo information written in a sector on a predetermined track of a disk having a plurality of tracks and for detecting information on each track in said servo information;

a calculator for calculating said head speed using said detected information on each of said tracks;

said current source decrementing gradually said reverse unlatching current by a predetermined brake current value if a value of said head speed is greater than the predetermined head speed limit value; and said current source supplying said decremented reverse unlatching current to said actuator.

17. The apparatus according to claim 16, further comprising:

said detector performing the search of said servo information at a polling time edge immediately following a predetermined deceleration edge if said information on each of said tracks is not detected during said deceleration edge;

said apparatus making a re-attempt to unlatch said head if the synchronization of said servo information is not accomplished in search of said servo information at said polling time edge.

18. The apparatus according to claim 13, said head speed being calculated by said calculator according to the following formula:

$$\text{the head speed} = \frac{\Delta \text{Track}}{T}$$

$$= \frac{\text{a previous gray code} - \text{a present gray code}}{T}$$

where, T=servo sampling period, and

ΔTrack=a distance between the previous track and the present track.

19. A process for controlling an unlatching operation of a head in a hard disk drive, comprising the steps of:

detecting servo information written in a plurality of sectors on a plurality of tracks of a disk within said hard disk drive when controlling unlatching of said head, with said servo information uniquely identifying a radial position of each track within an incrementally ordered serial array of said plurality of tracks borne by said disk;

making a determination of head speed of said head relative to said disk by using said servo information; and adjusting an unlatching current in dependence upon said determination of head speed.

20. The process of claim 19, further comprised of reading said servo information from among said sectors within a data zone bearing a multiplicity of said tracks, from among said sectors within an inner-guard band zone circumferentially interposed between said data zone and a parking zone of said disk where said head rests while an armature bearing said head is held stationary, and from among said sectors within an outer-guard band zone that separates said data zone from an outer peripheral edge of said disk.

21. The process of claim 19, further comprised of making said determination of said head speed according to the following formula:

$$\text{the head speed} = \frac{\Delta \text{Track}}{T}$$
$$= \frac{\text{a previous gray code} - \text{a present gray code}}{T}$$

where, T=servo sampling period, and
ΔTrack =a distance between the previous track and the present track.

22. The process of claim 19, further comprised of adjusting an unlatching deceleration component of said unlatching current after occurrence of a deceleration edge of said head speed.

23. A process for controlling an unlatching operation of a head in a hard disk drive, comprising the steps of:
unlatching said head by applying an unlatching current exhibiting a first amplitude and a first polarity to move an armature bearing said head from a parking zone on the disk where said head rests while said armature is held stationary;
altering said unlatching current to provide a deceleration component exhibiting a second and opposite polarity;
detecting servo information written in a plurality of sectors on a plurality of tracks of the disk within said hard disk drive when controlling said unlatching of said head, with said servo information comprising gray codes uniquely identifying a radial position of each track within an incrementally ordered serial array of said plurality of tracks borne by said disk;
making a determination of head speed of said head relative to said disk by using said servo information; and
modifying said deceleration component of said unlatching current in dependence upon said determination of head speed.

24. The process of claim 23, further comprised of reading said gray codes from among said sectors within an inner-guard band zone circumferentially interposed between a data zone bearing a multiplicity of said tracks and said parking zone, from among said sectors within said data zone, and from among said sectors within an outer-guard band zone that separates said data zone from an outer peripheral edge of the disk.

25. The process of claim 23, further comprised of making said determination of said head speed according to the following formula:

$$\text{the head speed} = \frac{\Delta \text{Track}}{T}$$
$$= \frac{\text{a previous one of said gray codes} - \text{a present one of said gray code}}{T}$$

where, T=servo sampling period, and
ΔTrack=a distance between the previous track and the present track.

26. The process of claim 23, further comprised of modifying an unlatching deceleration component of said unlatching current after occurrence of a deceleration edge of said head speed.

27. A process for controlling an unlatching of a head in a hard disk drive, comprising the steps of:
while controlling said unlatching of said head, detecting servo information comprising servo synchronization stored in a plurality of sectors on a plurality of tracks borne by a disk within said hard disk drive, with said servo synchronization providing a clock synchronization during reading of said servo information and identifying preambles of each of said sectors of said plurality of tracks;
making a determination of whether said servo synchronization has been read by said head;
making a determination of head speed of said head relative to said disk by using said servo information; and
varying said head speed of said head relative to said disk by adjusting an unlatching current in dependence upon said determination of whether said servo synchronization has been read by said head and in dependence upon said determination of said head speed.

28. The process of claim 27, further comprised of reading said servo information from among said sectors within a data zone bearing a multiplicity of said tracks, from among said sectors within an inner-guard band zone circumferentially interposed between said data zone and a parking zone of said disk where said head rests while an armature bearing said head is held stationary, and from among said sectors within an outer-guard band zone that separates said data zone from an outer peripheral edge of said disk.

29. The process of claim 27, further comprised of:
said servo information comprising a gray code corresponding to each of said sectors uniquely identifying a radial position of each track within an incrementally ordered serial array of said plurality of tracks borne by said disk;
when said determination establishes that the head is reading said servo synchronization, establishing said head speed of said head relative to said disk by using said servo information according to the following formula:

$$\text{the head speed} = \frac{\Delta \text{Track}}{T}$$
$$= \frac{\text{a previous gray code} - \text{a present gray code}}{T}$$

where, T=servo sampling period, and
ΔTrack=a distance between the previous track and the present track; and
adjusting said unlatching current in dependence upon said head speed established according to said formula.

30. The process of claim 27, further comprised of adjusting an unlatching deceleration component of said unlatching current after occurrence of a deceleration edge of said head speed.

31. The process of claim 27, further comprised of:
varying said head speed by adjusting an unlatching deceleration component of said unlatching current after occurrence of a deceleration edge of said head speed when said determination establishes that said servo synchronization has not been read by said head; and reducing said unlatching current to a negligible value when said determination establishes that said servo synchronization has been read by said head.

32. The process of claim 27, further comprised of:

when said determination establishes that said servo synchronization has not been read by said head, varying said head speed by adjusting an unlatching deceleration component of said unlatching current after occurrence of a deceleration edge of said head speed until said determination establishes that said servo synchronization has been read by said head;

said servo information uniquely identifying a radial position of each track within an incrementally ordered serial array of said plurality of tracks borne by said disk;

making a determination of head speed of said head relative to said disk by using said servo information; and adjusting said unlatching current in dependence upon said determination of head speed.

33. The process of claim 27, further comprised of:

when said determination establishes that said servo synchronization has not been read by said head, varying said head speed by adjusting an unlatching deceleration component of said unlatching current after occurrence of a deceleration edge of said head speed until said determination establishes that said servo synchronization has been read by said head;

said servo information further comprising a gray code corresponding to each of said sectors uniquely identifying a radial position of each track within an incrementally ordered serial array of said plurality of tracks borne by said disk;

when said determination establishes that the head is reading said servo synchronization, establishing said head speed of said head relative to said disk by using said servo information according to the following formula:

$$\text{the head speed} = \frac{\Delta \text{Track}}{T}$$
$$= \frac{\text{a previous gray code} - \text{a present gray code}}{T}$$

where, T=servo sampling period, and

ΔTrack=a distance between the previous track and the present track; and adjusting said unlatching current in dependence upon said head speed established according to said formula.

34. The process of claim 27, further comprised of:

when said determination establishes that said servo synchronization has not been read by said head, varying said head speed by adjusting an unlatching deceleration component of said unlatching current after occurrence of a deceleration edge of said head speed until said determination establishes that said servo synchronization has been read by said head;

said servo information uniquely identifying a radial position of each track within an incrementally ordered serial array of said plurality of tracks borne by said disk;

providing a first value of said head speed by using said servo information;

when said first value of said head speed is greater than a reference value, varying said head speed by adjusting an unlatching deceleration component of said unlatching current after occurrence of said deceleration edge; and when said first value is not greater than said reference value, reducing said unlatching current to a negligible value.

35. The process of claim 27 further comprising:

controlling said unlatching of said head by applying an unlatching current exhibiting a first polarity to move an armature bearing said head from a parking zone on the disk where said head rests while said armature is held stationary;

altering said unlatching current to provide a deceleration component exhibiting a second and opposite polarity; and adjusting said unlatching current by modifying said deceleration component of said unlatching current in dependence upon said determination of whether said servo synchronization has been read by said head and in dependence upon said determination of said head speed.

36. A process for controlling an unlatching operation of a head in a hard disk drive, comprising the steps of:

controlling unlatching of said head by applying an unlatching current exhibiting a first polarity to move an armature bearing said head from a parking zone on the disk where said head rests while said armature is held stationary;

altering said unlatching current to provide a deceleration component exhibiting a second and opposite polarity;

while controlling unlatching of said head, detecting servo information comprising servo synchronization stored in a plurality of sectors on a plurality of tracks borne by a disk within said hard disk drive, with said servo synchronization providing a clock synchronization during reading of said servo information and identifying preambles of each of said sectors of said plurality of tracks;

making a determination of whether said servo synchronization has been read by said head; and varying a head speed of said head relative to said disk by adjusting said deceleration component of said unlatching current in dependence upon said determination.

37. The process of claim 36, further comprised of reading said servo information from among said sectors within a data zone bearing a multiplicity of said tracks, from among said sectors within an inner-guard band zone circumferentially interposed between said data zone and said parking zone, and from among said sectors within an outer-guard band zone that separates said data zone from an outer peripheral edge of said disk.

38. The process of claim 36, further comprised of:

when said determination establishes that said servo synchronization has not been read by said head, varying said head speed by adjusting an unlatching deceleration component of said unlatching current after occurrence of a deceleration edge of said head speed until said determination establishes that said servo synchronization has been read by said head;

said servo information further comprising a gray code corresponding to each of said sectors uniquely identifying a radial position of each track within an incrementally ordered serial array of said plurality of tracks borne by said disk;

when said determination establishes that the head is reading said servo synchronization, establishing said head speed of said head relative to said disk by using said servo information according to the following formula:

$$\text{the head speed} = \frac{\Delta \text{Track}}{T}$$

$$= \frac{\text{a previous gray code} - \text{a present gray code}}{T}$$

where, T=servo sampling period, and

ΔTrack=a distance between the previous track and the present track; and adjusting said unlatching current in dependence upon said head speed established according to said formula.

* * * * *